United States Patent [19]

Smith, III

[11] Patent Number: 4,900,071
[45] Date of Patent: Feb. 13, 1990

[54] UNDERSEA HYDRAULIC COUPLING WITH DOVETAIL SEAL

[75] Inventor: Robert E. Smith, III, Stafford, Tex.

[73] Assignee: National Coupling Company, Inc., Stafford, Tex.

[21] Appl. No.: 236,026

[22] Filed: Aug. 24, 1988

[51] Int. Cl.[4] ............................................. F16L 29/00
[52] U.S. Cl. .................................... 285/379; 277/110
[58] Field of Search .................... 277/110, 111, 116.2, 277/117, 118, 119, 120, 105; 285/379, 910

[56] References Cited

U.S. PATENT DOCUMENTS

| | | | |
|---|---|---|---|
| 1,872,498 | 8/1932 | Rasmussen et al. | 285/379 X |
| 1,928,821 | 10/1933 | Santiago | 285/22 |
| 2,218,318 | 10/1940 | Pfauser | 284/19 |
| 2,265,267 | 12/1941 | Cowles | 284/19 |
| 2,598,009 | 5/1952 | Peeps | 285/379 X |
| 2,703,719 | 3/1955 | Grotless | 277/110 |
| 2,730,380 | 1/1956 | Espy et al. | 284/19 |
| 2,735,696 | 2/1956 | Omon et al. | 137/614.05 |
| 2,825,590 | 4/1958 | Sutherland | 286/26 |
| 3,046,026 | 7/1962 | Burrows | 277/171 |
| 3,089,713 | 5/1963 | Scaramucci | 285/14 |
| 3,111,179 | 11/1963 | Albers et al. | 175/393 |
| 3,215,161 | 11/1965 | Goodwin et al. | 137/614.04 |
| 3,236,251 | 2/1966 | Hansen | 137/614.05 |
| 3,291,152 | 12/1966 | Comer | 137/614.04 |
| 3,331,609 | 7/1967 | Moran | 277/110 X |
| 3,348,575 | 10/1967 | Simak | 137/614.05 |
| 3,507,523 | 4/1970 | Cadley | 285/307 |
| 3,550,624 | 12/1970 | Johnson | 137/614 |
| 3,618,690 | 11/1971 | Johnson | 137/514.7 |
| 3,707,878 | 1/1973 | Treichler | 92/164 |
| 3,797,510 | 3/1974 | Torres et al. | 137/68 |
| 4,124,228 | 11/1978 | Morrison | 285/1 |
| 4,222,411 | 9/1980 | Herzan et al. | 137/614.04 |
| 4,348,039 | 9/1982 | Miller | 285/1 |
| 4,452,462 | 6/1984 | Karr, Jr. | 277/105 |
| 4,582,295 | 4/1986 | Kugler et al. | 251/149.6 |
| 4,637,470 | 1/1987 | Weathers et al. | 166/344 |
| 4,641,841 | 2/1987 | Regan | 277/30 |
| 4,694,859 | 9/1987 | Smith | 137/614.04 |
| 4,709,726 | 12/1987 | Fitzgibbons | 137/614.04 |
| 4,754,780 | 7/1988 | Smith | 137/614.04 |
| 4,768,538 | 9/1988 | Mintz et al. | 137/15 |

FOREIGN PATENT DOCUMENTS

| | | | |
|---|---|---|---|
| 0024986 | 3/1981 | European Pat. Off. | |
| 647885 | 7/1937 | Fed. Rep. of Germany | |
| 663132 | 10/1928 | France | 137/614.04 |
| 1142462 | 12/1955 | France | 137/614.04 |
| 76801 | 11/1958 | France | 137/614.04 |
| 1491524 | 6/1966 | France | 137/614.04 |
| 343726 | 7/1956 | Switzerland | |
| 552435 | 4/1943 | United Kingdom | 284/19 |
| 552682 | 4/1943 | United Kingdom | |
| 677685 | 8/1952 | United Kingdom | |
| 819421 | 9/1959 | United Kingdom | |
| 886133 | 1/1962 | United Kingdom | |
| 888143 | 1/1962 | United Kingdom | |
| 1548852 | 7/1979 | United Kingdom | |
| 1564906 | 4/1980 | United Kingdom | |
| 1603670 | 11/1981 | United Kingdom | |

Primary Examiner—John Fox
Attorney, Agent, or Firm—Arnold, White & Durkee

[57] ABSTRACT

An undersea hydraulic coupling includes a male member and female member, and a two-piece retainer for restraining radial movement of a wedge-shaped annular seal into the central bore of the female member. The two-piece retainer includes a cylindrical retainer sleeve member slidably received within the female member bore, and a threaded retainer-locking member threadable to mating threads in the wall of the central bore. The retainer-locking member holds the retainer sleeve member in place within the female member bore. The annular seal is restrained from radial movement by a dovetail interfit with a mating shoulder on at least one of the retainer sleeve and the retainer-locking members.

15 Claims, 1 Drawing Sheet

UNDERSEA HYDRAULIC COUPLING WITH DOVETAIL SEAL

BACKGROUND OF THE INVENTION

1. Field of the Invention

The present invention relates to hydraulic couplings used in undersea drilling and production applications and seals used in those couplings. More particularly, the invention involves an annular seal that is restrained from radial movement into the bore of the female member by a dovetail interfit with a two-piece retainer.

2. Description of the Related Art

Subsea hydraulic couplings are old in the art. The couplings generally consist of a male and a female member with soft seals positioned within the female member to seal the junction between the male and female members.

The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion or probe at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the soft seals, resembling O-rings, either abut the end or face of the male member or engage the cylindrical probe wall about its circumference. The hydraulic fluid is then free to flow through the female and male portions of the coupling, and the seals prevent that flow from escaping about the joint and the coupling.

In some instances, a check valve may be installed in the female member and also in the male member. Each check valve opens when the coupling is made up and closes when the coupling is broken so as to prevent fluid from leaking out of the system of which the coupling is a part.

In U.S. Pat. No. 4,694,859 to Robert E. Smith, III, an undersea hydraulic coupling and metal seal is disclosed. This patent provides a reusable metal seal which engages the circumference of the probe and is positioned within the female member body. The metal seal is held in place by a cylindrical body or retainer. A clip holds the retainer within the body, preventing escape of the retainer or metal seal from the body. When the male and female portions of the coupling are parted under pressure, the retainer prevents the metal seal from blowing out through the bore of the female member.

U.S. Pat. No. 4,694,859 also discloses a soft annular seal or O-ring at the inner cylindrical surface of the retainer, which engages the probe circumference. The soft annular seal generally is used as a secondary seal, and prevents escape of fluid should the metal seal fail. As the probe begins to enter the retainer bore, it begins to engage a soft annular seal intermediate the retainer bore. This contact compresses the seal and creates a sliding seal between it and the probe wall. The annular seal or soft seal is of a relatively pliable material, for example, rubber or synthetic elastomer. The annular seal is generally ring-shaped and is located in a sealed groove.

A problem has been encountered with the soft annular seal intermediate the retainer. When the male member or probe is removed from the female member under high ambient seawater pressure, the soft annular seal oftentimes will blow out of the female member and be lost. There is no mechanism for retention of the soft annular seal in the female section.

The implosion of the soft seal is a characteristic problem in the prior art. As the male member or probe is pulled out of the female member bore, the leading face of the male member reaches the soft annular seal intermediate that bore. When the face crosses the midpoint of the soft annular seal, there is nothing to restrain the seal from radial movement into the bore. The very low pressure or vacuum in the bore results in the seal being imploded into the bore, as the ambient seawater begins to enter the bore at high pressure.

When the soft annular seal blows out through the female bore, it may be extremely difficult to replace the seal within the bore. There are also difficulties encountered in machining a groove in the female bore for the seal and inserting the seal in that groove.

The problem of blowing out or implosion of the soft annular seal and difficulties of manufacturing, assembly or reassembly are solved by the present invention.

SUMMARY OF THE INVENTION

The present invention overcomes the above-mentioned problems and disadvantages by providing a coupling wherein a soft annular seal is interposed between the first piece and second piece of a two-piece retainer. The seal has a dovetail interfit with the first piece and second piece whereby the seal is restrained from implosion or any radial movement into the central bore upon separation of the female member and male member. The two-piece retainer is adapted to be inserted into the female member bore before the male member or probe is inserted. In a preferred embodiment, the two-piece retainer serves to "load" and retain a metal seal.

The inner cylindrical surface of the soft annular seal, which has a dovetail interfit with the two-piece retainer, engages the circumference of the male member or probe as the probe is inserted through the retainer into the female member.

DETAILED DESCRIPTION OF A PREFERRED EMBODIMENT

Undersea hydraulic couplings are generally connected to opposing plates of a manifold and are held together by bolts or hydraulic members attached to the plates. The male and female members may be attached to the opposing plates using various means, such as set screws or threads. Techniques for attaching the members to such plates are well known to those skilled in the art.

Figure 1:
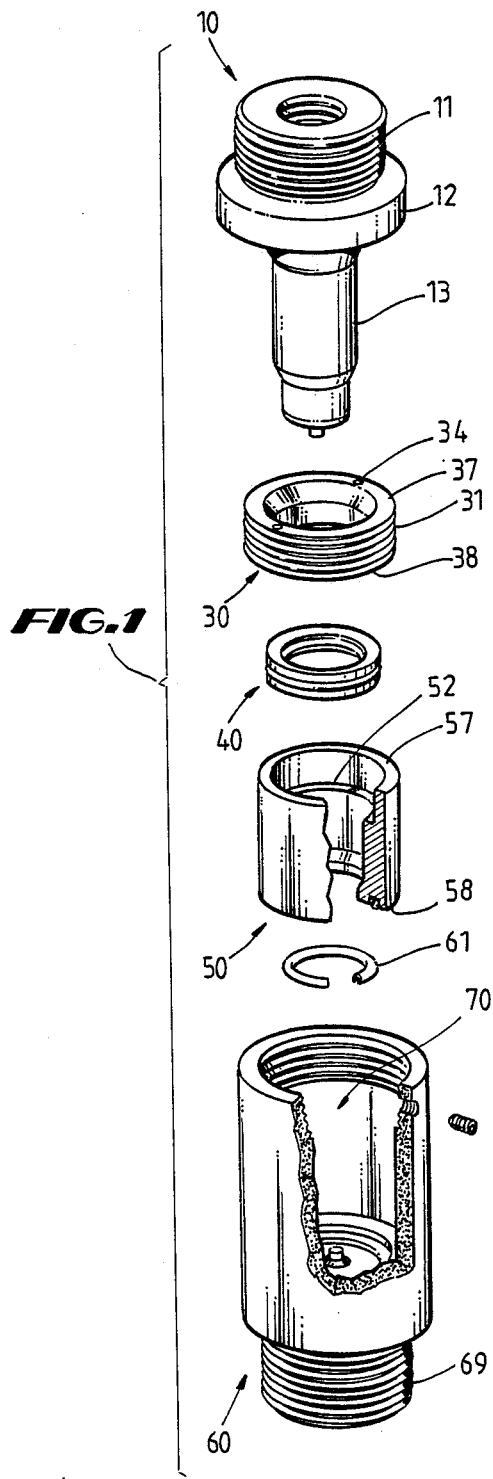
FIG. 1 is an exploded perspective view of one embodiment of the present invention with the retainer sleeve member, metal seal and female member body partially cut away.

FIG. 1 is an exploded perspective view of the coupling, two-piece retainer and seal according to a preferred embodiment of the invention. As shown, the main components of the coupling include a male member or probe 10, a threaded retainer-locking member 30, a dovetail seal 40, a retainer sleeve member 50, and a female member body 60. Each of these members comprise subcomponents which will be more fully described below.

As shown in FIG. 1, in a preferred embodiment the male member 10 comprises a handle 11, which may be threaded for attachment to a manifold plate. The handle terminates at flange 12 of the male member and tapered shoulder 20. The tapered shoulder 20 is tapered down to the first end of the cylindrical probe wall 13 which terminates at probe face 21. The cylindrical probe wall 13 is adapted for sliding engagement with the two-piece retainer, as will be discussed below.

The body of the male member also is provided with a central bore 14. The bore 14 may have several variations in its diameter as it extends through the body of the male member. In a preferred embodiment, the first end of the central bore comprises an internally threaded section 24 for connection to a hydraulic line. A cylindrical passageway 25 extends longitudinally within the male member body and terminates at valve seat 16 which is an inclined shoulder.

Figure 2:
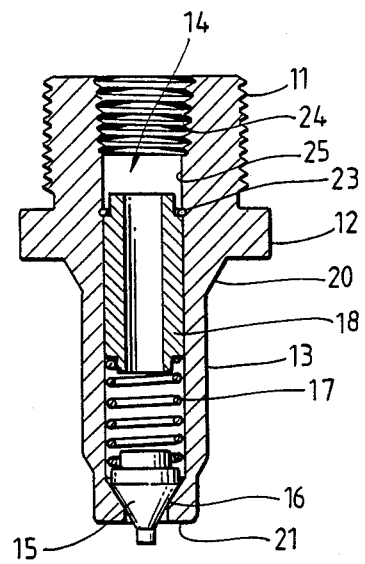
FIG. 2 is a section view of the male member.

As shown in FIG. 2, a valve assembly is slidably received within the central bore 14 of the male member. The valve assembly comprises a conical poppet valve 15 which sealingly engages the valve seat 16 in its normally closed position. Helical valve spring 17 is used to urge the poppet valve into a closed position against the valve seat. The helical valve spring 17 is located within the cylindrical passageway 25 and is anchored at spring collar 18 which is held in place by collar clip 23 inserted within the inner surface of the cylindrical passageway of the male member.

The two-piece retainer comprises a retainer-locking member 30 and retainer sleeve member 50. The retainer-locking member holds the sleeve member in place within the female member and may be tightened down to "load" the metal seal 61. As shown in FIG. 1, in a preferred embodiment the retainer-locking member 30 is cylindrical in shape having threads 31 on its outer cylindrical surface. As will be apparent to those skilled in the art, other means may be used to connect the retainer-locking member to the female member bore. The face of the first end 37 of the retainer-locking member includes expander wrench holes 34 used for tightening the retainer-locking member in the mating threads of the female member when it is installed. The bore of the retainer-locking member comprises a stepped central bore beginning at the first end 37 having an upper probe seat or tapered surface 33. The tapered surface 33 is engageable with the tapered shoulder 20 of the male member or probe, and inclines downwardly and inwardly to gradually reduce the diameter of the bore down to inner cylindrical surface 36. The face of the second end 38 of the retainer-locking member terminates at a frustoconical surface 35 with its base intermediate the surface of the face and its crest at the edge closest to the inner cylindrical surface 36.

Figure 3:
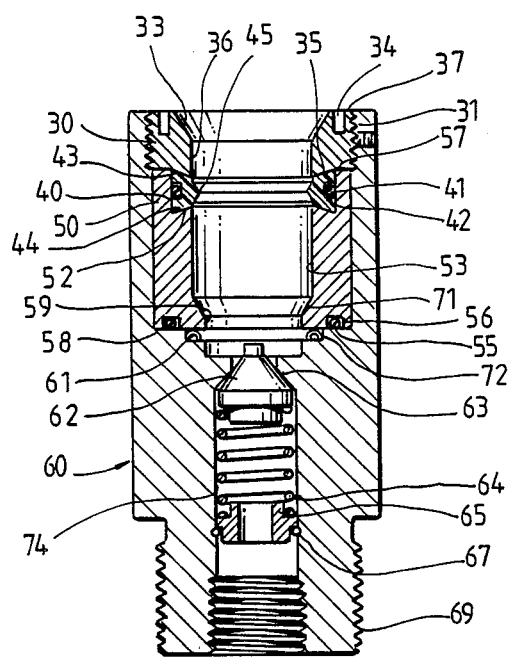
FIG. 3 is a section view of the female member body with the metal seal, two-piece retainer, and dovetail seal in place.

Also shown in FIG. 1, dovetail seal 40 is a wedge-shaped annular seal interposed between the retainer-locking member 30 and the retainer sleeve member 50. In a preferred embodiment, the dovetail seal 40 includes a groove or channel 42 about the circumference of the outer cylindrical surface, and an elastomeric seal or O-ring 41 which is interposed in that groove. As shown in FIG. 3, the inner cylindrical surface of the dovetail seal comprises a ridge 45 which is sealingly engageable with the cylindrical probe wall 13 of the male member.

The retainer sleeve member 50 is essentially a sleeve with an annular shape. As shown in FIG. 1, the outside diameter of the retainer sleeve member 50 is uniform and has a sliding fit within the bore 70 of the female member. The retainer sleeve member has a bore extending therethrough from a first end 57 to a second end or face 58. The diameter of the bore varies along the longitudinal axis of the retainer sleeve member 50. The first end of the bore is generally defined by a retainer sleeve dovetail surface or reverse inclined shoulder 52, a cylindrical retainer wall 53 and a lower probe seat 71.

As shown in FIG. 3, bore 51 has its greatest diameter at the first end having the retainer sleeve dovetail surface or reverse inclined shoulder 52. This shoulder has its crest at the inner cylindrical surface or retainer wall 53. The retainer wall 53 begins at the lower edge of the reverse inclined shoulder and terminates at the upper edge of the lower probe seat 71. The lower probe seat 71 is at the second end of the bore and slopes inwardly and downwardly, further restricting the diameter of the bore. The lower probe seat 71 terminates at its lower end at a lower retainer wall 59, which terminates at the second end or retainer face 58. The retainer face 58 lies in a plane perpendicular to the longitudinal axis of retainer 50. The retainer face 58 includes a face seal channel or groove 56 which is annular in shape, as shown in FIG. 3, and is centered on the longitudinal axis of the retainer 50. Annular elastomeric seal 55 is generally ring-shaped and is located in the channel 56. Also shown in FIG. 1 is the metal seal 61 which is ring-shaped and is interposed between the retainer sleeve member 50 and the shoulder 72 of the female member.

Female member 60 comprises a body having a receiving chamber 70 for receiving the male member or probe 10, and a handle 69 which optionally may be threaded to a manifold plate (not shown). As shown in FIG. 3, the valve assembly of the female member comprises a poppet valve 62 which is slidably received within the cylindrical passageway 74 of the female member 60. Poppet valve 62 is conical in shape and is urged by valve spring 64 into a seated position against the valve seat 63. When the poppet valve is in a closed position against the valve seat as shown in FIG. 3, it seals fluid from flowing between the male member and female member. The hollow spring collar 65 anchors the valve spring 64 and is held in place by collar clip 67.

In a preferred embodiment, the metal seal 61 is disposed along the shoulder 72. The operation of the metal seal is described in detail in U.S. Pat. No. 4,694,859 to Robert E. Smith, III. In a preferred embodiment, the retainer sleeve member 50 serves to "load" and retain the annular metal seal. The retainer-locking member 30 locks the retainer sleeve member in place.

As shown in FIG. 3, the dovetail seal 40 is positioned between the retainer sleeve member and the threaded retainer-locking member. The dovetail seal is wedge-shaped in cross-section, having an outer cylindrical surface with greater axial thickness than its inner cylindrical surface. The first end 43 and second end 44 of the dovetail seal member are restrained from radial movement by the frustoconical surface 35 of the threaded retainer-locking member, and the reverse inclined shoulder 52 of the retainer sleeve member. Thus, the dovetail seal forms the male portion of a dovetail interfit while the retainer sleeve member and threaded retainer-locking member together form the female portion of the dovetail interfit. The dovetail interfit restrains the annular seal from radial movement into the retainer bore when the male member or probe 10 is removed from the female member 60.

Because the dovetail seal 40 is restrained from radial movement towards the central axis or bore of the two-piece retainer, the male and female members may be separated without risk of blowing out the dovetail seal. This feature is of great advantage in subsea environments where the coupling is parted under pressure.

Other advantages of the present invention include the reusable nature of the dovetail seal 40. As distinguished from the prior art, the dovetail seal may be used and replaced repeatedly as desired.

Another advantage of the present invention is the relative ease of assembly and disassembly of the female member. This advantage accrues not only during manufacturing, but also for replacement of the soft seal between the two-piece retainer.

An additional advantage of the coupling of the present invention is its ready substitutability for hydraulic couplings of the prior art. The coupling of the present invention can replace a coupling of the prior art on a one-for-one basis without further modification of the new coupling or the use of preload mechanisms or other equipment beyond the coupling itself. Additionally, partial separation between the male member or probe and the female member can be tolerated using the coupling and seal of the present invention.

As can be expected and as will be appreciated by one skilled in the art, the embodiment of the present invention described above may be modified in numerous ways without departing from the scope of the invention. For example, the metal seal 61 and elastomeric seal 55 may be eliminated without affecting the operation of the two-piece retainer and dovetail seal of the present invention.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a body having a central axis and a first longitudinal bore concentric with the axis and having a circumferential shoulder intermediate the bore;
   (b) a two-piece retainer adapted to be inserted into a first end of the first longitudinal bore and to seat on the shoulder, the retainer having a second longitudinal bore concentric with the axis;
   (c) a probe having an outer circumference, the probe adapted to be inserted through the second longitudinal bore and into the first longitudinal bore;
   (d) a first annular elastomeric seal adapted to be inserted between each piece of the two-piece retainer, the first annular seal having a wedge-shaped cross-section mating with a corresponding wedge-shaped shoulder on at least one piece of the two-piece retainer, the first annular seal configured to engage the circumference of the probe as the probe is inserted through the second bore and into the first bore;
   (e) a second annular metal seal insertable into the first longitudinal bore to be interposed between the shoulder and the two-piece retainer, the second seal configured to engage the first bore and the circumference of the probe as the probe is inserted through the second bore and into the first bore.

2. The coupling of claim 1 wherein the two-piece retainer comprises a slidable sleeve member and an externally threaded locking member, at least one of the members having a dovetail interfit with the first annular seal whereby the first annular seal is restrained from inward movement toward the central axis upon withdrawal of the probe from the first and second longitudinal bores.

3. The coupling of claim 2 wherein the slidable sleeve member comprises a cylindrical sleeve having a first and second end and a circumferential shoulder adjacent the first end, the shoulder having a tapered surface with its crest proximate the wall of the second longitudinal bore.

4. The coupling of claim 3 wherein the second end of the slidable sleeve member further comprises a face, a circular groove on the face, and an elastomeric seal positionable in the circular groove.

5. The coupling of claim 3 wherein the slidable sleeve member comprises a stepped central bore beginning at a first diameter proximate the first end and terminating at a narrower second diameter proximate the second end, and a tapered surface therebetween, the tapered surface engageable with the circumference of the probe.

6. The coupling of claim 2 wherein the threaded locking member comprises a threaded cylindrical sleeve having a first and second end and a frustoconical surface having its base on the face of the first end of the threaded locking member and its crest proximate the wall of the second longitudinal bore.

7. The coupling of claim 6 wherein the threaded locking member comprises a stepped central bore beginning at a first diameter proximate the first end and terminating at a second tapered surface proximate the second end, the tapered surface engageable with the circumference of the probe.

8. The coupling of claim 1 wherein the first annular seal comprises a ring-shaped elastomeric seal having a ridge about the circumference of the inner cylindrical surface, the ridge being sealingly engageable with the circumference of the probe.

9. The coupling of claim 1 wherein the first annular seal comprises a ring-shaped elastomeric seal having a groove about the circumference of the outer cylindrical surface, and an O-ring positionable in the groove.

10. The coupling of claim 1 wherein the second annular seal comprises a metal seal for engagement with the first longitudinal bore and with the circumference of the probe, the metal seal having a cavity exposed to fluid pressure within the first longitudinal bore.

11. A female member of an undersea hydraulic coupling comprising:
   (a) a body having a first longitudinal bore extending therethrough and a circumferential shoulder;
   (b) a retainer sleeve member having first and second ends adapted to be slidably inserted into the first longitudinal bore, the first end abutting the circumferential shoulder;
   (c) a metal seal insertable into the first longitudinal bore interposed between the first end of the retainer sleeve and the circumferential shoulder;

(d) a retainer-locking member adapted to be inserted into the first longitudinal bore, the retainer-locking member configured to interengage the body and the retainer sleeve member so as to maintain the retainer sleeve member in abutting relationship with the circumferential shoulder;

(e) an elastomeric seal having a wedge-shaped cross-section, adapted to be interposed between the second end of the retainer sleeve member and the retainer-locking member, at least one of the retainer sleeve and retainer-locking members having a circumferential shoulder configured to restrain the elastomeric seal from moving into the first longitudinal bore in response to forces tending to urge the elastomeric seal to move radially inwardly.

12. The female member of claim 11 wherein the retainer sleeve member further comprises a central bore and a circumferential shoulder proximate the second end of the retainer sleeve member, the shoulder having a tapered surface with its crest proximate the wall of the central bore.

13. The female member of claim 11 wherein the retainer-locking member comprises an externally threaded cylindrical member having a central bore, the retainer-locking member being threadable into mating threads in the wall of the first longitudinal bore.

14. The female member of claim 13 wherein the retainer-locking member further comprises a frustoconical surface configured to assist the circumferential shoulder in restraining radial movement of the elastomeric seal, whereby the wedge-shaped seal has a dovetail interfit between the circumferential shoulder and the frustoconical surface.

15. An undersea hydraulic coupling comprising:

a female member having a central bore extending therethrough and a circumferential shoulder intermediate the central bore, a male member adapted to be inserted into the central bore, forming an annulus therebetween;

a two-piece retainer configured to be inserted into the annulus; and an elastomeric seal configured to engage the male member as the male member is inserted into the central bore, the elastomeric seal interposed between the first piece and second piece of the two-piece retainer and having an interfit with the first piece and second piece whereby the retainer restrains the elastomeric seal from radial movement into the central bore upon separation of the female member and male member; and a metal seal interposed between the two-piece retainer and the circumferential shoulder.

* * * * *